United States Patent
Mikami et al.

(10) Patent No.: US 8,861,982 B2
(45) Date of Patent: Oct. 14, 2014

(54) INTERFEROMETER, DEMODULATOR, AND OPTICAL COMMUNICATION MODULE

(75) Inventors: Hideharu Mikami, Kawasaki (JP); Taichi Kogure, Kamakura (JP)

(73) Assignee: Oclaro Japan, Inc., Kanagawa (JP)

(*) Notice: Subject to any disclaimer, the term of this patent is extended or adjusted under 35 U.S.C. 154(b) by 386 days.

(21) Appl. No.: 12/985,385

(22) Filed: Jan. 6, 2011

(65) Prior Publication Data
US 2011/0188850 A1    Aug. 4, 2011

(30) Foreign Application Priority Data

Feb. 1, 2010  (JP) ................. 2010-019875

(51) Int. Cl.
| | | |
|---|---|---|
| H04B 10/06 | (2006.01) | |
| G02B 26/00 | (2006.01) | |
| G02F 1/01 | (2006.01) | |
| G02F 2/00 | (2006.01) | |
| G02F 1/061 | (2006.01) | |

(52) U.S. Cl.
CPC ........ *G02B 26/00* (2013.01); *G02F 1/01* (2013.01); *G02F 2/00* (2013.01); *G02F 1/061* (2013.01)
USPC ........... 398/212; 398/202; 398/203; 398/204; 398/205; 398/206; 398/207; 398/213

(58) Field of Classification Search
None
See application file for complete search history.

(56) References Cited

U.S. PATENT DOCUMENTS

| | | | |
|---|---|---|---|
| 5,323,229 A * | 6/1994 | May et al. ............ 356/479 |
| 6,341,039 B1 | 1/2002 | Flanders et al. | |
| 6,377,591 B1 * | 4/2002 | Hollister et al. ........... 372/6 |
| 7,171,076 B2 | 1/2007 | Shibata | |
| 7,389,055 B1 * | 6/2008 | Rickard et al. ............. 398/206 |
| 7,613,403 B2 | 11/2009 | Hironishi et al. | |
| 7,817,923 B2 | 10/2010 | Akiyama et al. | |
| 7,848,659 B2 | 12/2010 | Miura et al. | |
| 7,848,662 B2 | 12/2010 | Suzuki et al. | |
| 2006/0013530 A1 | 1/2006 | Shibata | |
| 2006/0056845 A1 * | 3/2006 | Parsons et al. ............. 398/41 |
| 2006/0263098 A1 | 11/2006 | Akiyama et al. | |
| 2006/0268277 A1 | 11/2006 | Hsieh et al. | |
| 2007/0047966 A1 | 3/2007 | Hironishi et al. | |
| 2007/0065161 A1 | 3/2007 | Miura et al. | |
| 2007/0264029 A1 * | 11/2007 | Suzuki et al. ................. 398/188 |
| 2009/0027683 A1 | 1/2009 | Suzuki et al. | |
| 2010/0040383 A1 | 2/2010 | Hironishi et al. | |

FOREIGN PATENT DOCUMENTS

| | | |
|---|---|---|
| JP | 2004-286783 | 10/2004 |
| JP | 2007043638 | 2/2007 |
| JP | 2007067955 | 3/2007 |
| JP | 2007082094 | 3/2007 |
| JP | 2007306371 | 11/2007 |
| JP | 2008537652 | 9/2008 |
| WO | WO2004/099848 | 11/2004 |

* cited by examiner

*Primary Examiner* — Darren E Wolf
(74) *Attorney, Agent, or Firm* — Antonelli, Terrry, Stout & Kraus, LLP.

(57) ABSTRACT

When designing a demodulator for a DPSK-modulated signal, it is required that optical phase modulation is performed fast and the demodulator has a long lifetime. To achieve this object, a delay line interferometer inside the demodulator performs adjustment of phase difference between two split lights caused to interfere, using a first optical phase modulation unit such as a Piezo actuator and a second optical phase modulation unit such as a heating element that operates slower in modulation speed than the first optical phase modulation unit and is slower in deterioration speed.

18 Claims, 11 Drawing Sheets

INTERFEROMETER, DEMODULATOR, AND OPTICAL COMMUNICATION MODULE

CLAIM OF PRIORITY

The present application claims priority from Japanese patent application JP 2010-019875 filed on Feb. 1, 2010, the content of which is hereby incorporated by reference into this application.

CROSS-REFERENCE TO RELATED APPLICATIONS

This application is related to U.S. application Ser. No. 12/826,763 filed on Jun. 30, 2010, and U.S. application Ser. No. 12/896,948 filed on Oct. 4, 2010, the disclosure of which is hereby incorporated by reference.

FIELD OF THE INVENTION

The present invention relates to an interferometer, a demodulator that demodulates a differential phase-shift keying signal, and an optical communication apparatus (module) using it.

BACKGROUND OF THE INVENTION

In the optical communication field, a simplest scheme has been used that effects an intensity modulation as signal modulation and converts optical intensity directly into an electrical signal using a light detector. In recent years, however, a method of effecting phase modulation as signal modulation is drawing attention in order to address high bit rates above 40 Gbps. There are two methods of demodulating a phase-modulated signal: a method of demodulating a light transmitted after undergoing signal modulation by interfering it with a light from a local oscillator provided in a receiver (the coherent method); and a method of splitting a signal-modulated light into two beams, combining and interfering them with one bit of modulated signal out of phase, and converting a phase shift into optical intensity signal (the differential phase shift keying method). The differential phase shift keying method is drawing attention as a method relatively closer to practical use, since it is not necessary to synchronize the frequency of a signal light with that of a locally emitted light, unlike the coherent method. The differential phase shift keying is called Differential Binary Phase Shift Keying (DBPSK or DPSK), Differential Quadrature Phase Shift Keying (DQPSK), or the like, depending on the number of phases to be modified.

The demodulation method of the DPSK is described below with reference to FIG. 1. A DPSK-modulated signal 101 enters a delay line interferometer 102, and is split into two beams by a splitter like a half beam splitter 103. One of the two split lights is given an optical path of 1 bit long (for example, if signal modulation frequency is 40 GHz, about 7.5 mm) with respect to the other split light by a delay part 104 consisting of mirrors, and is set so that an optical path length difference between the two split lights becomes an integral multiple of light wavelength (that is, phase difference is 0). Then, the two split lights are recombined by a half-beam splitter 105 and two interference lights 106, 107 are generated. At this time, since an interference light 106 undergoes a constructive interference when an amount of phase shift between adjacent bits is 0 and a destructive interference when it is π, a phase difference is converted to an intensity difference for the interference light according to a phase shift amount between the adjacent bits. Since an interference light 107 is an interference light whose phase differs by π from the interference light 106, destructive interference results when the interference light 106 undergoes constructive interference and constructive interference results when the interference light 107 undergoes destructive interference, and thus a reversed light intensity is output. A demodulated signal is obtained by detecting an intensity difference between these interference lights with a differential detector 110 consisting of a balanced photodetector 108 and a trans-impedance amplifier 109.

Demodulation in DQPSK is performed by using two interferometers similar to those used for demodulation in the DPSK, as shown in FIG. 2. More specifically, a modulated signal 200 is split into two beams by a half-beam splitter 201, respective split lights are led to different interferometer 202, 203, and two reference lights generated in the respective delay line interferometers are detected by differential detectors 204, 205. However, while the delay line interferometer 202 sets a delay part 206 so that an optical path length difference between the two split lights becomes an integral multiple, the delay line interferometer 203 sets a delay part 207 so that an optical path length difference between the two split lights differs by $(n+¼)\lambda$ (n is an integer and $\lambda$ is wavelength of a light). At this time, when an amount of phase shift between adjacent bits is 0, π, a constructive interference or a destructive interference occurs in the delay line interferometer 202, and when π/2, 3π/2, a constructive interference or a destructive interference occurs in the delay line interferometer 203. This makes it possible to demodulate four-valued differential phase shift keying signals from outputs of differential detectors 204, 205. Furthermore, it is possible to demodulate any M-valued differential phase shift keying signals.

As an implementation of abovementioned delay line interferometer, two configurations are conceived; one in which a planar lightwave circuit is mainly used and one in which a free space optics with bulk optical components is used. The former is easy to mass-produce, but has disadvantages such as high power consumption due to required temperature control, and large size. In contrast, the latter is easy to decrease power consumption and can be made relatively smaller in size, thus drawing attention as a dominant implementation.

Meanwhile, in the abovementioned delay line interferometer that demodulates a DPSK-modulated signal, the wavelength of the modulated signal is not constant, and generally the wavelength of an incoming light differs according to the configuration of a communication system. If the wavelength entering the delay line interferometer differs, a value set for optical path length difference naturally varies and therefore the delay line interferometer will require means for adjusting optical path length. Also, even if the wavelength is constant, in a case where optical path length drifts due to temperature changes, adjustment of the optical path length to offset the drift is required. As optical path length adjusting means like this, a method of using thermo-optic effect and a method of using a Piezo actuator are shown in Patent Document 1 (JP-A-2007-306371) and Patent Document 2 (JP-A-2008-537652) respectively. The method of using thermo-optic effect is a method in which a medium whose refractive index with high temperature dependence (dn/dT), such as silicon monocrystal, is inserted in the optical path of a delay line interferometer, and optical path length (phase difference) is controlled by controlling temperatures of this medium. The method of using a Piezo actuator is a method in which a mirror reflecting split lights in the delay line interferometer is attached to a Piezo actuator, and phase difference control is effected by changing the mirror position according to a drive voltage of the Piezo actuator.

Patent Documents 1 and 2 (JP-A Nos. 2007-306371 and 2008-537652) show delay line interferometers using a free space optics, but delay line interferometers using a planar lightwave circuit basically make optical phase modulation by means of temperature control. In Patent Document 3 (JP-A-2007-67955), for example, optical phase modulation is realized by causing changes in reflective index and thermal expansion of a wave guide and an effective change in optical path length of a optical path through the wave guide. Also, in Patent Document 3, a method of performing a optical phase modulation using electro-optic effect is described. In this case, optical phase modulation of a light is performed by driving a voltage for an electro-optic element to change its reflective index.

Furthermore, in Patent Documents 4 and 5 (JP-A Nos. 2007-082094 and 2007-043638) describe that relative phase difference is given by making asymmetric applied voltages and temperatures for phase shift components disposed in a set of planar lightwave circuit, such as electrodes, thin-film heaters, piezoelectric elements, etc.

Patent Documents 6 and 7 (JP-A Nos. 2004-286783 and WO04/099848) relate to a distributed slope compensation element and describe controlling a central wavelength of distribution, but their technical field, i.e., distribution slope compensation, differs from that of the present application.

SUMMARY OF THE INVENTION

In an optical communication system using the DPSK, the wavelength of a light to be input to each delay line interferometer constituting the system changes when the system is activated. At the activation of the system, an operation of switching the wavelength of a light to be input to each receiver and performing a optical phase modulation for an interferometer each time is repeated, in order to optimize the network configuration. Here, the inventor found a problem that, in conventional arts, system activation time becomes very long due to slow speed of the abovementioned optical phase modulation. For example, in a case where temperature control is used as optical phase modulation unit as in Patent Documents 1 and 3 (optical phase modulation speed: several tens of milliseconds to several seconds), it takes more than several minutes to activate the system. On the other hand, if the Piezo actuator in Patent Document 2 is used, it is possible to perform a optical phase modulation relatively faster and thereby shorten the system activation time, but property of the Piezo actuator is deteriorated by continuous activation thereof, causing a optical phase modulation amount for a prescribed drive voltage to decrease and eventually become insufficient. This results in a problem that a lifetime of the delay line interferometer as an element, i.e., a time period during which the prescribed specifications are satisfied when it is used continuously, shortens. In Patent Document 2, the delay line interferometer is made athermal and therefore feedback control of a drive voltage is not necessary when an input wavelength is constant after system activation; however, it is necessary to constantly supply a certain drive voltage due to the necessity of maintaining a desired phase in the input wavelength, which basically causes a drive voltage to be constantly supplied to the Piezo actuator during operation of the system, thus resulting in a remarkably shortened lifetime of the interferometer. Also, in a case optical phase modulation is performed using the electro-optic element described in Patent Document 3, optical phase modulation speed is fast and the lifetime is relatively long, but since the element itself is very large and expensive it is not suitable for implementing the delay line interferometer.

Patent Documents 4 and 5 relate to using a heater and a Piezo actuator for the phase modulator in a receiver for the DPSK and do not relate to a receiver of the present application. In addition, they do not describe about using a heater and a Piezo actuator together.

In view of the above problems, an object of the present invention is to provide a DPSK signal demodulator provided with the delay line interferometer which is fast in optical phase modulation, and small, inexpensive, and long-lived, and also an optical communication module equipped with it.

The following means were used to achieve the objective of the present invention.

A light to be measured is split into a first beam and a second beam by means of a half beam splitter or the like, adjustment of phase difference between the first and second split lights is performed by using a first phase adjust means such as a Piezo actuator and a second optical phase modulation unit such as a silicon monocrystal which operates slower than the first optical phase modulation unit and is slow in deterioration speed, and the first and second split lights are entered and combined in wave combination means such as the half beam splitter to generate a first interference light and a second interference light. Here, the deterioration speed means a time period in which, when optical phase modulation unit is continuously driven, a optical phase modulation amount needed for a prescribed drive signal amount (i.e., amount of electric current, voltage, etc.) becomes less than a prescribed value.

The configuration like this makes it possible to perform a optical phase modulation fast as needed and also maintain a sufficiently long lifetime of the apparatus.

As the first optical phase modulation unit described above, a Piezo actuator was used that is provided with a mirror for either of the first and second split lights. This enables a fast optical phase modulation at a speed of 1 ms or less, thus making it possible to shorten the activation speed of an optical communication system using this apparatus.

As the second optical phase modulation unit described above, a heating element such as a silicon monocrystal inserted in the optical path of either the first split light or the second split light was used. This allows a optical phase modulation to be performed in a simple configuration.

In another means, a liquid crystal component was used as the second optical phase modulation unit. This makes it possible to reduce a power consumption required for phase control.

In another means, as the second optical phase modulation unit, an expanding component, such as copper, was used that has a mirror reflecting either of the first and second split lights. This makes it possible to reduce the number of elements to be inserted in the optical path of a split light and thereby reduce insertion loss and facilitate an assembly adjustment of the apparatus.

In another means, as the first optical phase modulation unit, an MEMS MIRROR was used that reflects either of the first and second split lights. This makes it possible to perform a optical phase modulation with a low drive voltage and thereby facilitate implementation of a drive circuit.

The demodulator is configured so that a measured light is split into the first and second split lights by a splitting means such as a half beam splitter; adjustment of the phase difference between the first and second split lights is performed by using a first optical phase modulation unit such as a Piezo actuator and a second optical phase modulation unit such as a silicon monocrystal which operates slower than the first optical phase modulation unit and which is slow to deteriorate; the first and second split lights are combined by entering them in a combination means such as the half beam splitter; the first and second interference lights are generated; these lights are received by a differential detector; and an electrical signal is output that is equivalent to an intensity difference between the first and second interference lights.

This configuration makes it possible to perform a optical phase modulation fast as needed and also perform a optical phase modulation required for obtaining a precise regeneration signal in a case such as where the wavelength of a measured light fluctuates.

As another configuration, a measured light is first split by a splitting means such as the half beam splitter and then an electric signal is output for each split light by the configuration of the abovementioned demodulator.

This makes it possible to perform a optical phase modulation even for a general differential M-phase shift keying signal.

The optical communication module comprises a transmitter that transmits a pulse-like DPSK signal and a receiver in which a measured DPSK light is input and which generates a plurality of data signals and clock signals, the receiver including an optical splitting means, such as a half beam splitter, that splits the measured light into a first split light and a second split light, an optical wave combination means, such as a half beam splitter, that combines the first and second split lights, a first optical phase modulation unit, such as a Piezo actuator, that adjusts a phase difference between the first and second split lights, a second optical phase modulation unit, such as a silicon monocrystal, that adjusts a phase difference between the first and second split lights and that operates slower than the first optical phase modulation unit and is slower to deteriorate than the first optical phase modulation unit, and the optical communication module also having an interferometer that generates a first interference light and a second interference light, a detector that detects the first and second interference lights and outputs an electric signal equivalent to a intensity difference between the first and second interference lights, a signal processor that generates a plurality of data signals from the electric signal output from the detector, a first driver that generates an adjustment signal to the first optical phase modulation unit, a second driver that generates an adjustment signal to the second optical phase modulation unit, and a controller that controls the adjustment signals generated by the first and second drivers.

This configuration makes it possible to perform a optical phase modulation fast as needed and also perform an optical phase modulation required for obtaining a precise regeneration signal in a case such as where the wavelength of a measured light fluctuates.

Also, in the optical communication module described above, at the time of activation of an optical communication system including the optical communication module starts, the first driver is activated and the second driver does is not activated, and during the normal operation of the system, the second driver is activated and the first driver is not activated.

This makes it possible to realize a fast optical phase modulation at the time of activation of the system when a fast optical phase modulation is required, and also extend the lifetime of the apparatus.

Also, the controller is configured to sets an adjustment signal from the first driver to zero at approximately the same or slower than the operation speed of the second optical phase modulation unit, and at the same time perform a optical phase modulation by the second driver, when switching from the activation to the normal operation of the optical communication system.

This makes it possible to keep the phase of an interference light constant when switching from the activation to the normal operation of the system, and also continuously obtain a regeneration signal.

The controller sets an adjustment signal to be generated by the second driver to zero when the optical communication system switches from normal operation to activation, then keeps the adjustment signal of both the first and second drivers at zero at approximately the same or faster operation speed of the second optical phase modulation unit, and then causes the first driver to perform a phase control but the second driver not to perform a phase control.

This makes it possible to minimize a stroke needed for the first optical phase modulation unit, i.e., a phase modulation range.

According to the present invention, it is possible to provide a demodulator and an optical communication module that are faster in optical phase modulation speed and longer in lifetime than the conventional arts.

DETAILED DESCRIPTION OF THE PREFERRED EMBODIMENTS

First Embodiment

An embodiment of the present invention is described below with reference to FIG. 3.

Figure 1:
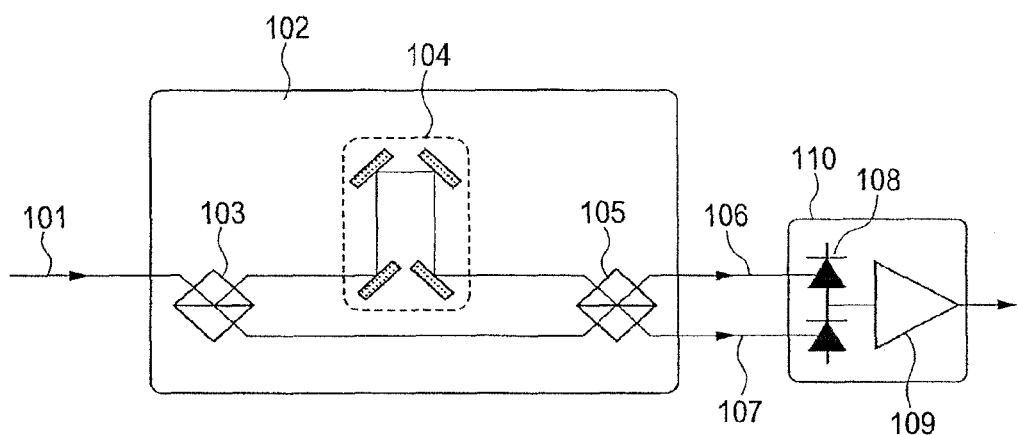
FIG. 1 is a schematic view of a DPSK demodulator.
Figure 2:
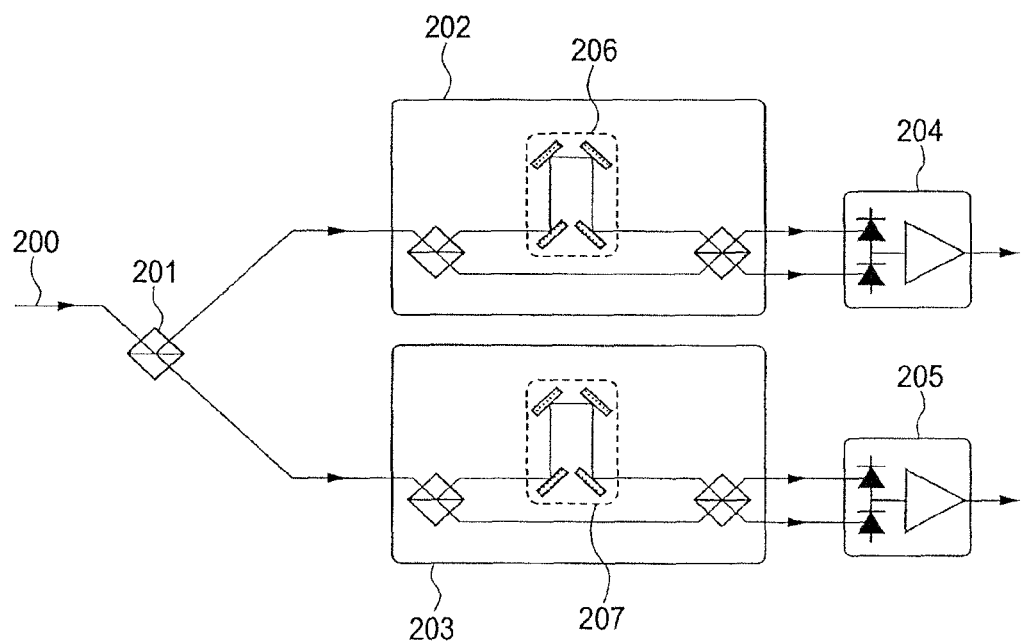
FIG. 2 is a schematic view of a DQPSK demodulator.
Figure 3:
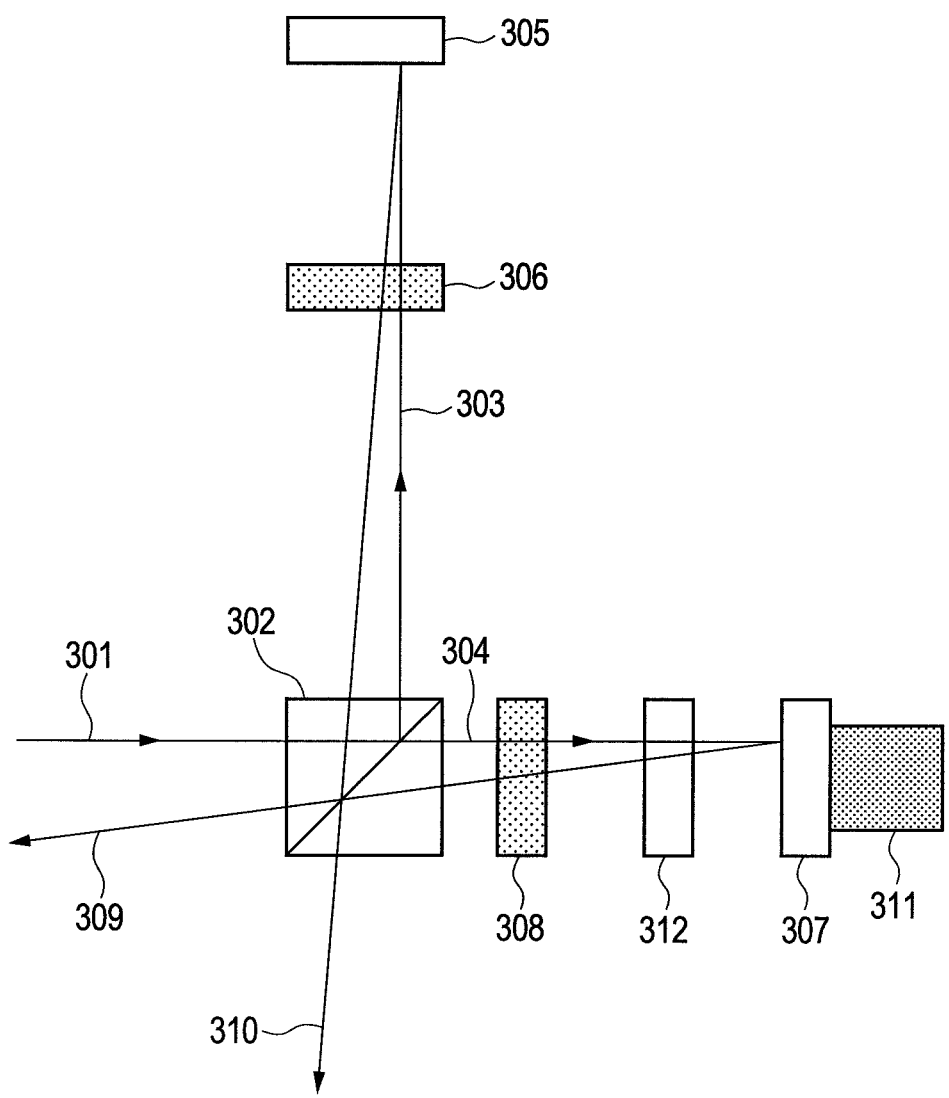
FIG. 3 is a view showing an example of an optical system that realizes an interferometer of the present invention.

FIG. 3 shows a basic embodiment of the present invention. A modulated signal 301 that has been DPSK-modulated enters a half beam splitter 302 and is split into a first split light 303 and a second split light 304 at an intensity ratio of 1:1. The first split light 303 enters a mirror 305 at approximately 90 degrees and a reflected light from the mirror 305 enters the half beam splitter 302 again. Here, a quarter-wave plate 306 is inserted in outbound and inbound optical paths of the first split light and its fast axis is directed to a direction of 45 degrees relative to p-polarization that is defined by a separation plane of the half beam splitter 302. As a result, p-polarization component of the polarization of the first split light 303 is converted to s-polarization upon re-entering the half beam splitter 302, and likewise s-polarization component is converted to p-polarization component. The p-polarization component and the s-polarization component are reversed since the second split light 304 enters a mirror 307 mounted on the Piezo actuator 311 at an approximately 90 degrees, a reflective light enters the half beam splitter 302 again, and the quarter-wave plate 308 (phase advance direction is at 45 degrees relative to the p-polarization) is inserted in the outbound and inbound optical paths. Also, a silicon monocrystal 312 is inserted in the outbound and inbound optical paths and is used for optical phase modulation as described later. The first split light 303 and the second split light 304 are combined when they enter the half beam splitter 302 again, and a first interference light 309 and a second interference light 310 are generated. Here, the mirrors 305 and 307 are disposed so that a difference in optical path length between the first split light 303 and the second split light 304 is equivalent to one bit of signal modulation of a modulated signal. For example, when modulating frequency is 40 Gbps, the difference in optical path length becomes approximately 7.5 mm. Furthermore, temperature control for the silicon monocrystal 312 or drive voltage control for the Piezo actuator 311 is performed so as to stabilize an interference phase difference (the detail of this operation is described later). Consequently, the first interference light 309 and the second interference light 310 fall into either constructive interference or destructive interference state, thus resulting in a DPSK signal being converted to an optical intensity signal.

Here, the first split light 303 and the second split light 304 cause a relative phase difference between respective p-polarization component and s-polarization component when at the time of combination thereof. This means that the respective split lights have different optical path lengths due to polarization components. In this embodiment, however, since the two split lights move in and out the quarter-wave plate to reverse the p-polarization component and s-polarization component, a relative phase difference caused when a measured light is split and a relative phase difference caused when split lights are combined offset and therefore it is possible to obtain an interference state without being affected by polarization state.

Here, function of the quarter-wave plates 306, 308 is described in detail. Generally, when electric fields of lights entered from two input ports of the beam splitter are E1 and E2, $$\begin{pmatrix} E_1 \\ E_2 \end{pmatrix} \quad \text{Expression 1}$$

Two optical electric fields generated after passing through the beam splitter are expressed in vector as follows:

$$\begin{pmatrix} ie^{i\phi}\sqrt{R} & \sqrt{T} \\ \sqrt{T} & ie^{-i\phi}\sqrt{R} \end{pmatrix} \begin{pmatrix} E_1 \\ E_2 \end{pmatrix} \quad \text{Expression 2}$$

A matrix 2×2 in this expression represents an action of the beam splitter, R and T are equivalent to absolute values of intensity reflectance and intensity transmittance respectively of the beam splitter, and φ is equivalent to a phase difference caused between a transmitted light and a reflected light. This φ differs between p-polarization and s-polarization and consequently the phase of interference differs according to polarization state, which causes a phenomenon (polarization dependent, frequency shift, or PDFS) in which it is observed that frequency of a light seems to has shifted according to polarization state. Therefore, the φ values for p-polarization and s-polarization are represented as φp and φs respectively. Also, it is assumed that a measured light is p-polarization.

In Expression 2 above, since in a state where a measured light is split by the half beam splitter 302, E2=0, and if it is assumed that there is no loss in the half beam splitter and the light is split 1:1, then T=R=½, the electric field of the light after splitting is expressed as follows:

$$\frac{1}{\sqrt{2}} \begin{pmatrix} ie^{i\phi_p} & 1 \\ 1 & ie^{-i\phi_p} \end{pmatrix} \begin{pmatrix} E_1 \\ 0 \end{pmatrix} \quad \text{Expression 3}$$

The first component of this vector represents a reflected light (i.e., the first split light 303 in the embodiment), and the second component represents a transmitted light (i.e., the second split light 304 in the embodiment) respectively. Here, if optical path lengths until the reflected light and the transmitted light are combined again by the same half beam splitter are represented as 11 and 12, the process from splitting to combination is expressed by the following matrix:

$$\begin{pmatrix} \exp[2\pi i l_1/\lambda] & 0 \\ 0 & \exp[2\pi i l_2/\lambda] \end{pmatrix} \quad \text{Expression 4}$$

Furthermore, since the two split lights pass in and out the quarter-wave plate whose phase advance direction has been set at 45 degrees relative to p-polarization, p-polarization is converted to s-polarization. This causes the combination process of split lights is expressed by a matrix 2×2 in which T=R=½, φ=φs as in the 2×2 matrix in Expression 2. Accordingly, the electric field of an interference light is expressed as follows:

$$\frac{1}{2} \begin{pmatrix} ie^{i\phi_s} & 1 \\ 1 & ie^{-i\phi_s} \end{pmatrix} \quad \text{Expression 5}$$

$$\begin{pmatrix} \exp[2\pi i l_1/\lambda] & 0 \\ 0 & \exp[2\pi i l_2/\lambda] \end{pmatrix} \begin{pmatrix} ie^{i\phi_p} & 1 \\ 1 & ie^{-i\phi_p} \end{pmatrix} \begin{pmatrix} E_1 \\ 0 \end{pmatrix}$$

To clarify this, since electric fields of the first interference light 309 and the second interference light 310 are the first component and second component of the above vector, they are expressed as follows:

$$\frac{e^{il_2}}{2}\left(-\exp\left[i\left(2\pi\frac{l_1-l_2}{\lambda}+\phi_p+\phi_s\right)\right]+1\right)E_1 \quad \text{Expression 6}$$

$$\frac{ie^{i(-b+2\pi l_2/\lambda)}}{2}\left(\exp\left[i\left(2\pi\frac{l_1-l_2}{\lambda}+\phi_p+\phi_s\right)\right]+1\right)E_1 \quad \text{Expression 7}$$

Also, since the intensities of the respective interference lights are squares of absolute value thereof, the intensities become as follows:

$$\frac{1}{2}|E_1|^2\left(1-\cos\left[2\pi\frac{l_1-l_2}{\lambda}+\phi_p+\phi_s\right]\right) \quad \text{Expression 8}$$

$$\frac{1}{2}|E_1|^2\left(1+\cos\left[2\pi\frac{l_1-l_2}{\lambda}+\phi_p+\phi_s\right]\right) \quad \text{Expression 9}$$

For example, in Expression 8, when the inside of the cosine is 0, interference is constructive, and when π, interference is destructive. Therefore, by setting the inside of the cosine to zero when the optical path length difference between two split lights are l1-l2 which are equivalent to one bit of a modulated signal, it is possible to demodulate the signal.

Here, a case where input polarization is s-polarization is considered. In this case, a phase φ generated in the half beam splitter 302 becomes φ=φs when a measured light is split, and φ=φp when the split lights are combined. Here, since no change occurs even if φs and φp are exchanged in Expressions 8 and 9, if a measured light is s-polarization, the interference intensity is also expressed in Expressions 8 and 9 as for p-polarization. Furthermore, since a general polarization state is expressed by overlapping of p-polarization and s-polarization, even if a measured light is in any polarization state, intensity of a reference light is expressed by Expressions 8 and 9. That is, since interference state is not polarization dependent, PDFS will not occur.

Considering, for comparison, a case where the quarter-wave plate is not inserted, interference intensity becomes as follows by replacing φs is replaced with φp in Expression 9:

$$\frac{1}{2}|E_1|^2\left(1-\cos\left[2\pi\frac{l_1-l_2}{\lambda}+2\phi_p\right]\right) \quad \text{Expression 10}$$

$$\frac{1}{2}|E_1|^2\left(1+\cos\left[2\pi\frac{l_1-l_2}{\lambda}+2\phi_p\right]\right) \quad \text{Expression 11}$$

Similarly, if a measured light is s-polarization, the intensity becomes as follows:

$$\frac{1}{2}|E_1|^2\left(1-\cos\left[2\pi\frac{l_1-l_2}{\lambda}+2\phi_s\right]\right) \quad \text{Expression 12}$$

$$\frac{1}{2}|E_1|^2\left(1+\cos\left[2\pi\frac{l_1-l_2}{\lambda}+2\phi_s\right]\right) \quad \text{Expression 13}$$

Therefore, phase φ generated in the half beam splitter differs according to polarization, i.e., when φp≠φs interference state differs according to polarization and thus PDFS occurs.

Next, details of interference optical phase modulation by the silicon monocrystal 312 and the Piezo actuator 311 is described below.

Increasing the temperature of the silicon monocrystal 312 increases refractive index and thereby increases the optical path length of the split light 304. Temperature dependence (dn/dT) of the refractive index of a silicon monocrystal is approximately $1.0 \times 1.0^{-4}$ [k$^{-1}$], and if thickness of the silicon monocrystal 312 is 0.5 mm in this embodiment, when temperature of the silicon monocrystal 312 is increased by 1K, optical path length changes by 100 nm. Optical phase modulation speed depends on the heat capacity of a silicon monocrystal and is on the order of seconds.

A Piezo actuator is a element that is expanded or contracted by application of a voltage, and in this embodiment, optical path length of the split light 304 is controlled by drive voltage, taking advantage of movement of the mirror 307 in the light traveling direction caused by the expansion or contraction of the element. Speed of optical phase modulation by the Piezo actuator depends on combined resonance frequency of the Piezo actuator and the mirror 307 attached thereto, and about 1 ms or less optical phase modulation speed is possible.

There are two cases where an interference optical phase modulation is required: (1) where optical path length drifts due to temperature and (2) where an incident wavelength changes. In this embodiment, basically, in the case (1) phase control is performed by temperature adjustment of the silicon monocrystal 312, and in the case (2) phase control is performed by adjustment of drive voltage of the Piezo actuator 311. The case (2) occurs only at the time of activation of a communication system, and since incident wavelength is constant after completion of the system activation, only the case (1) needs to be considered. Therefore, since optical phase modulation is performed using the Piezo actuator at the time of activation of the communication system, it is possible to perform optical phase modulation fast and thereby shorten the system activation time. In contrast, on completion of the system activation no voltage is driven for the Piezo actuator, and optical phase modulation is performed by temperature control of the silicon monocrystal 312. Accordingly, since no voltage is driven for the Piezo actuator most of the time except for the system activation, it is possible to keep the lifetime of the element long. In addition, speed required for optical phase modulation in the case (1) derives from temperature change and therefore is on the order of seconds, which is sufficient in terms of speed even with the silicon monocrystal 312 used.

Figure 4A:
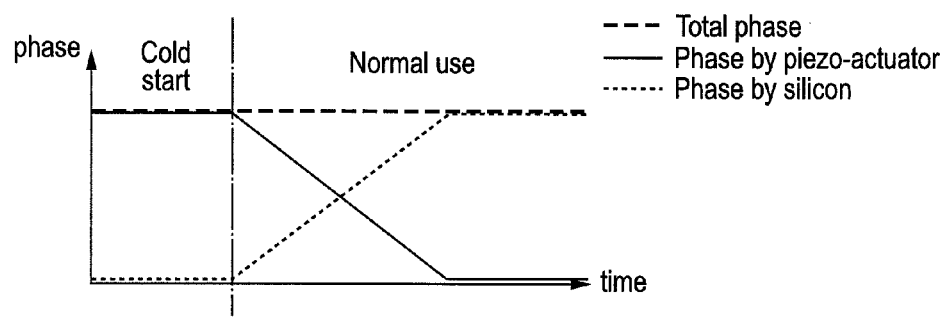
FIGS. 4A and 4B are views illustrating a method of driving a optical phase modulation unit when switching between the time of activation and the normal operation of the system.
Figure 4B:
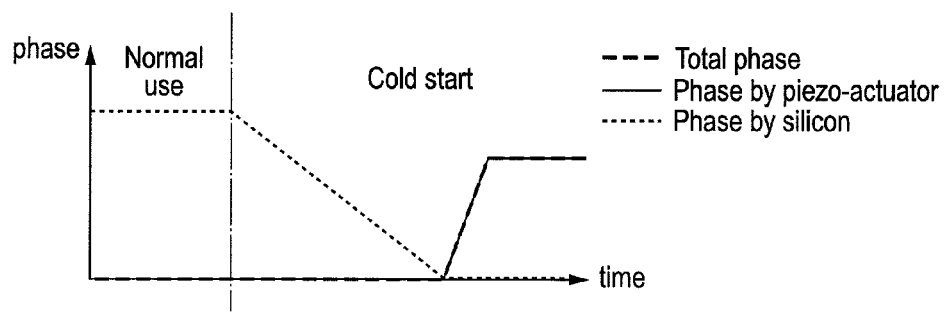

Here, switching of drive for a optical phase modulation element at the time of system activation and on completion of system activation (in normal operation) is described in detail. First, a case where changing from system activation (cold start) to normal operation (normal use) is described with reference to FIG. 4A. At the time of system activation, the Piezo actuator 311 is driven and temperature control of the silicon monocrystal 312 is not performed. On completion of the system activation, waveforms to be input are fixed. Then, temperature control of the silicon monocrystal 312 starts. And then, drive voltage of the Piezo actuator is gradually lowered at almost the same speed as optical phase modulation speed of the silicon monocrystal 312 and eventually down to nearly zero. Even during this time, the silicon monocrystal 312 is controlled in temperature and therefore the phase is kept constant, thus making it possible to change the phase control element from the Piezo actuator 311 to the silicon monocrystal 312. In FIG. 4A, drive voltage of the Piezo actuator is lowered at almost the same speed as optical phase modulation speed of the silicon monocrystal 312, but lowering it at a lower speed may be possible so as to the phase is kept almost constant during the time of change of phase control element. The "almost constant" used here means that the phase of a modulated signal may turn out to be supposedly constant than the intensities of the interference lights 309, 310. Now, change from normal operation to system activation is described with reference to FIG. 4B. In this case, only the silicon monocrystal 312 is controlled in temperature during normal operation, and temperature control of the silicon monocrystal is turned off and the Piezo actuator is driven when the phase shift due to heat generated in the silicon monocrystal sufficiently decreased after sufficient time has passed. That is, both an adjustment signal for the silicon monocrystal and one for the Piezo actuator are kept at zero during almost the same time as the operation speed of the silicon monocrystal or longer than it, and then a drive voltage for the Piezo actuator is applied. This makes it possible to perform a optical phase modulation without extra strokes of the Piezo actuator. (Conversely, if the Piezo actuator is driven with phase shift due to the silicon monocrystal remains, extra strokes of the Piezo actuator may be required for the remaining phase shift).

Figure 5:
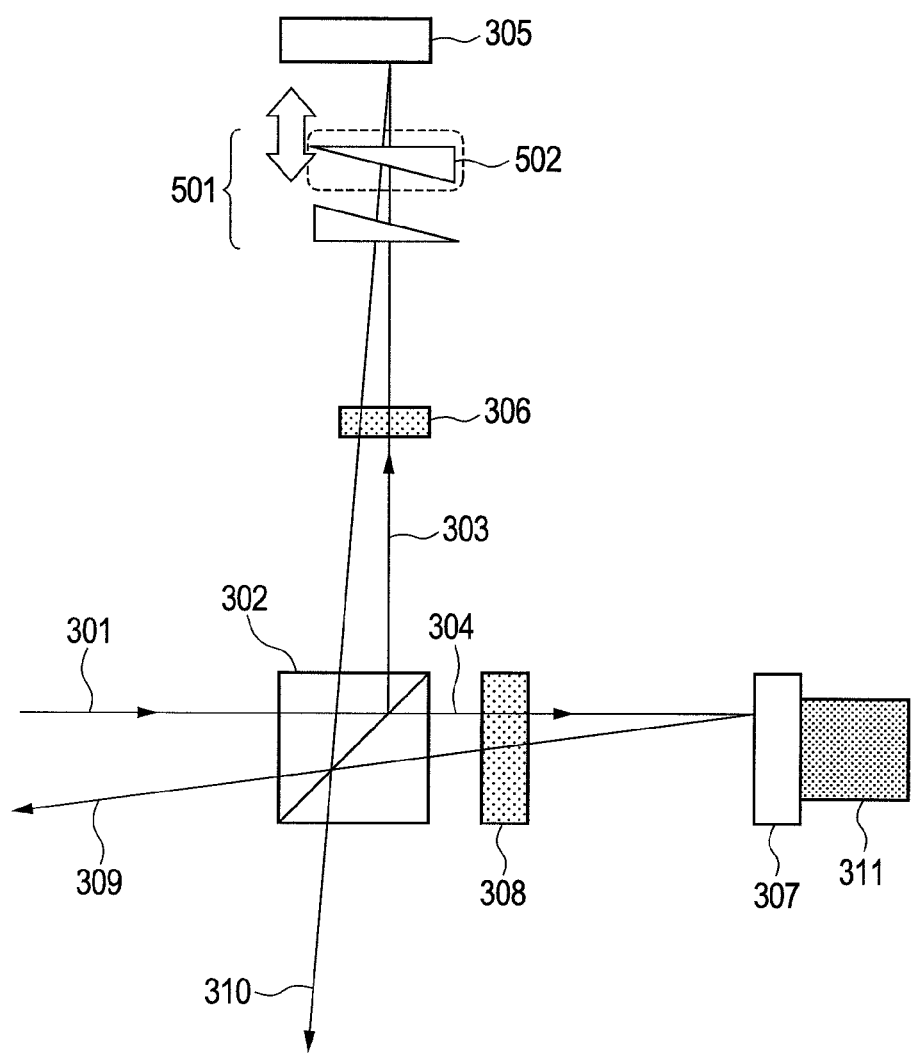
FIG. 5 is a view showing a configuration when performing a optical phase modulation with a pair of wedge prisms.
Figure 6:
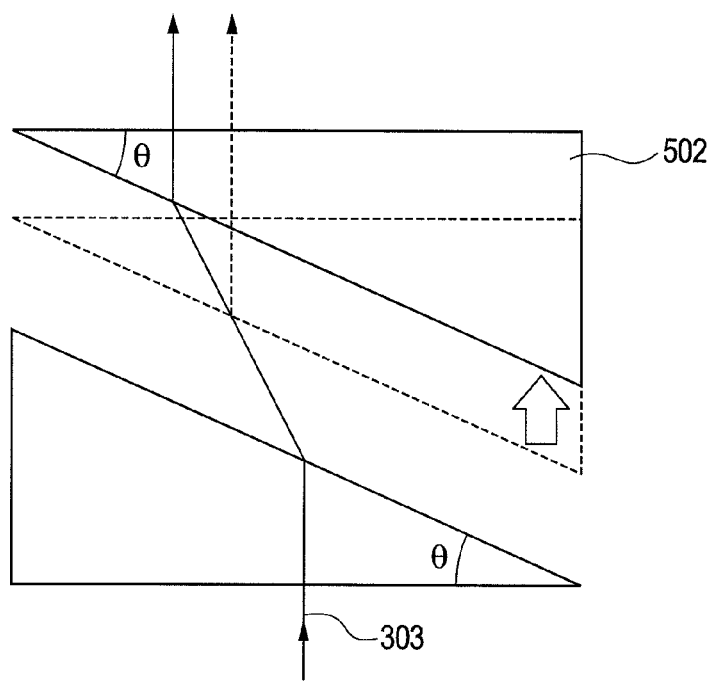
FIG. 6 is a detail view of the wedge prism.

Although a Piezo actuator and a silicon monocrystal are employed as a optical phase modulation element in this embodiment, embodiment is not limited to it. For example, polycrystalline silicon may be used instead of a silicon monocrystal. Also, FIG. 5 is a view showing a configuration when performing a optical phase modulation with a pair of wedge prisms 501 instead of silicon monocrystal. In this case, by moving one wedge prism constituting the pair of wedge prisms 501 in the direction of light axis of the split light 303, optical path of the split light 303 is changed and thereby its optical path length is change to perform a optical phase modulation. (Displacement in a direction perpendicular to the light axis of light flux is offset by outbound and inbound optical paths). If light wavelength of light used as an example is 1550 mm, wedge prism medium is BK 7 (refractive index: 1.50), and vertex angle is 2.5 degree, optical path length caused when the wedge prism 502 has been moved by 10 mm in a light axis direction is 4.77 μm and optical phase modulation of 19.34 radian is effected.

Second Embodiment

This embodiment is an embodiment in which the silicon monocrystal 312 in First Embodiment is replaced with a liquid crystal component. In this case, optical path length of the split light 304 changes due to a drive voltage for the liquid crystal component and thereby optical phase modulation is made possible. The liquid crystal component is one in which layers of equivalent thickness are glued together with their light axes crossed at 90 degrees, and it is possible to cause a phase difference not due to polarization of a split light. If a silicon monocrystal is used as in First Embodiment, large power consumption of several 100 mV to several watts is required for heating the silicon monocrystal with a heater or the like, but power consumption of a liquid crystal component is very small (1 mW or less) because an electric current hardly flows therein. Therefore, this embodiment allows for a small power consumption of the apparatus.

Third Embodiment

Figure 7:
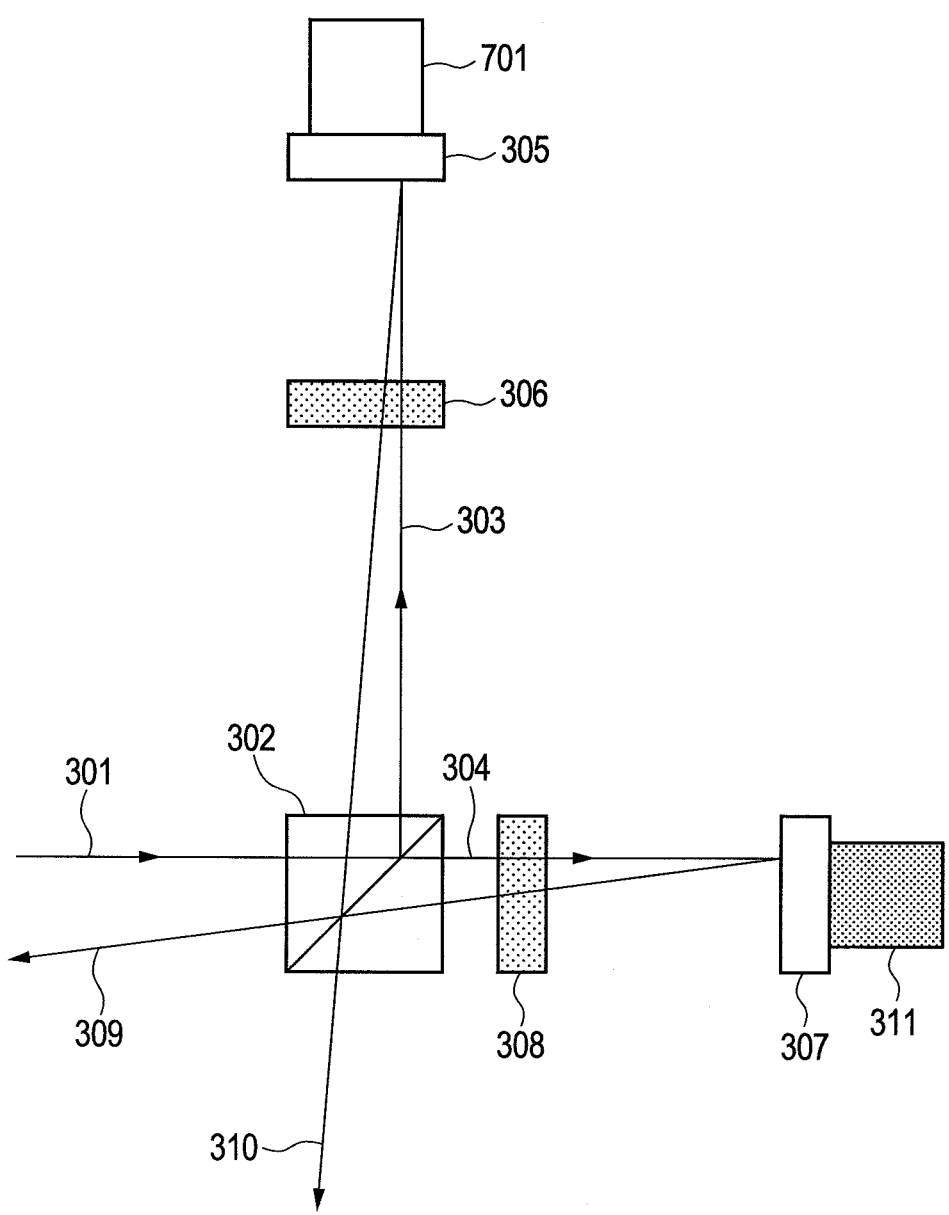
FIG. 7 is a view showing another embodiment for performing a optical phase modulation with an expanding component.

FIG. 7 is a view showing another embodiment in which optical phase modulation is done by thermal expansion of an expanding component on which a mirror reflecting one of split lights instead of the silicon monocrystal 312. In this case, an expanding component 701 is expanded by heating it and optical phase modulation is done by displacing a mirror 305. If wavelength of a light to be used as an example is 1550 nm, copper (linear expansion coefficient is used as an expanding component, and thickness of the expanding component is 5 mm, a change in optical path length when the expanding component is heated by 1° C. is 168 nm and a optical phase modulation of 0.68 radian is made. By performing a optical phase modulation with an expanding component that is not inserted in optical path as in this embodiment, it is possible to minimize the number of medium to be inserted in optical path, reduce the insertion loss of the apparatus, and facilitate the assembly adjustment.

Figure 8:
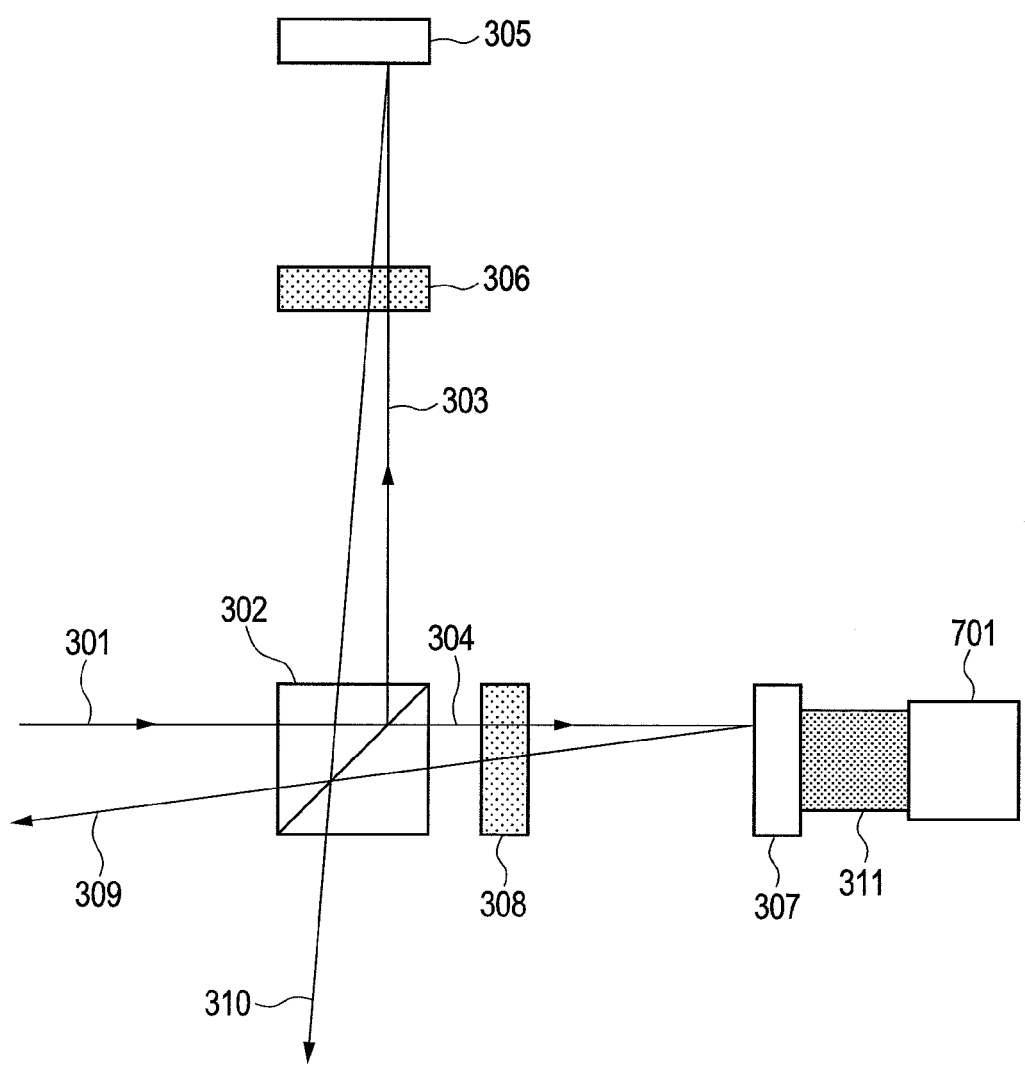
FIG. 8 is a view showing a configuration when the expanding component is positioned behind a Piezo actuator.

Position of the expanding component 701 is not limited to that in this embodiment, and it may be disposed behind the Piezo actuator 311 as in FIG. 8 or may be disposed between the mirror 307 and the Piezo actuator 311. Of course, other than copper may be used as an expanding component.

Figure 9:
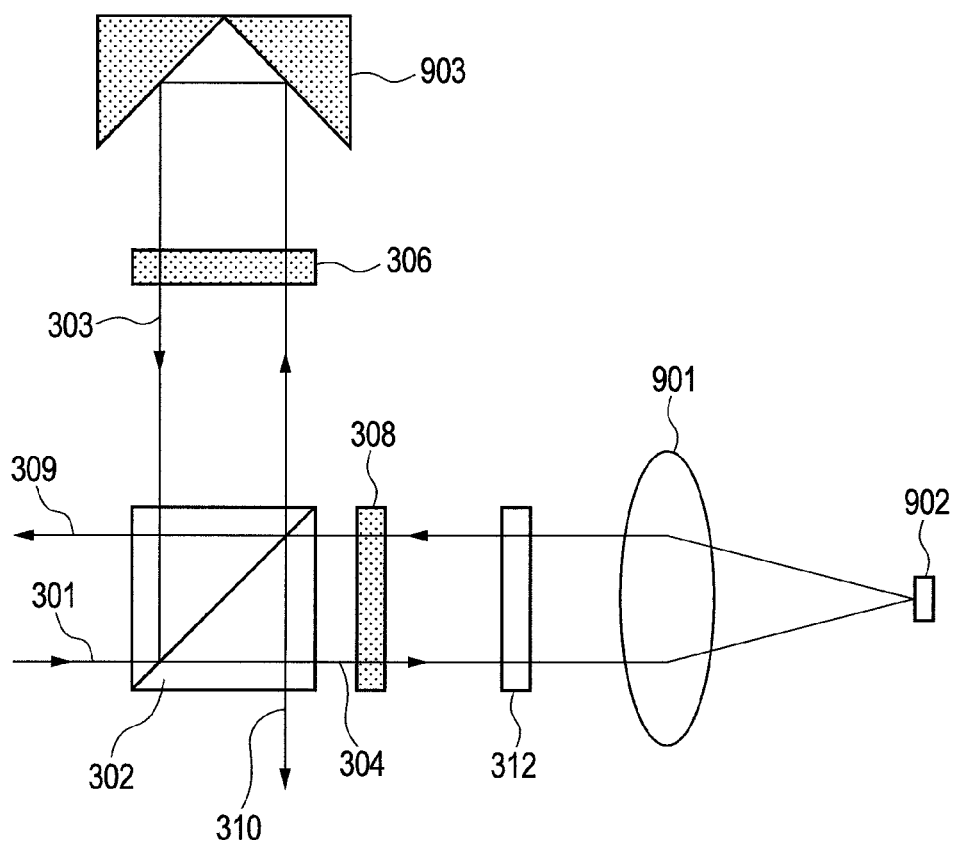
FIG. 9 is a view showing another embodiment for performing a optical phase modulation with a MEMS MIRROR.

FIG. 9 is a view showing another embodiment that performs a optical phase modulation with an MEMS MIRROR reflecting one of split lights instead of the Piezo actuator in First Embodiment. In this case, the split light 304 is collected into an MEMS MIRROR by a lens 901, and beams reflected by an MEMS MIRROR 902 enter the lens 901 again to become parallel beams. Also, the split light 303 is reflected by a pair of mirrors 903 not in parallel. The MEMS MIRROR 902 is a mirror that is displaced in the direction of normal to the mirror plane by a drive voltage (for example, refer to U.S. Pat. No. 6,341,039). Therefore, optical path length of the split light 304 changes according to a drive voltage for the MEMS MIRROR 902 to allow optical phase modulation. While drive voltage for the Piezo actuator in First Embodiment is generally high (several tens of volts to several hundreds of volts), the MEMS MIRROR can be driven by a low drive voltage of a few voltages. Therefore, the configuration of this embodiment makes it easy to perform optical phase modulation.

Fifth Embodiment

Figure 10:
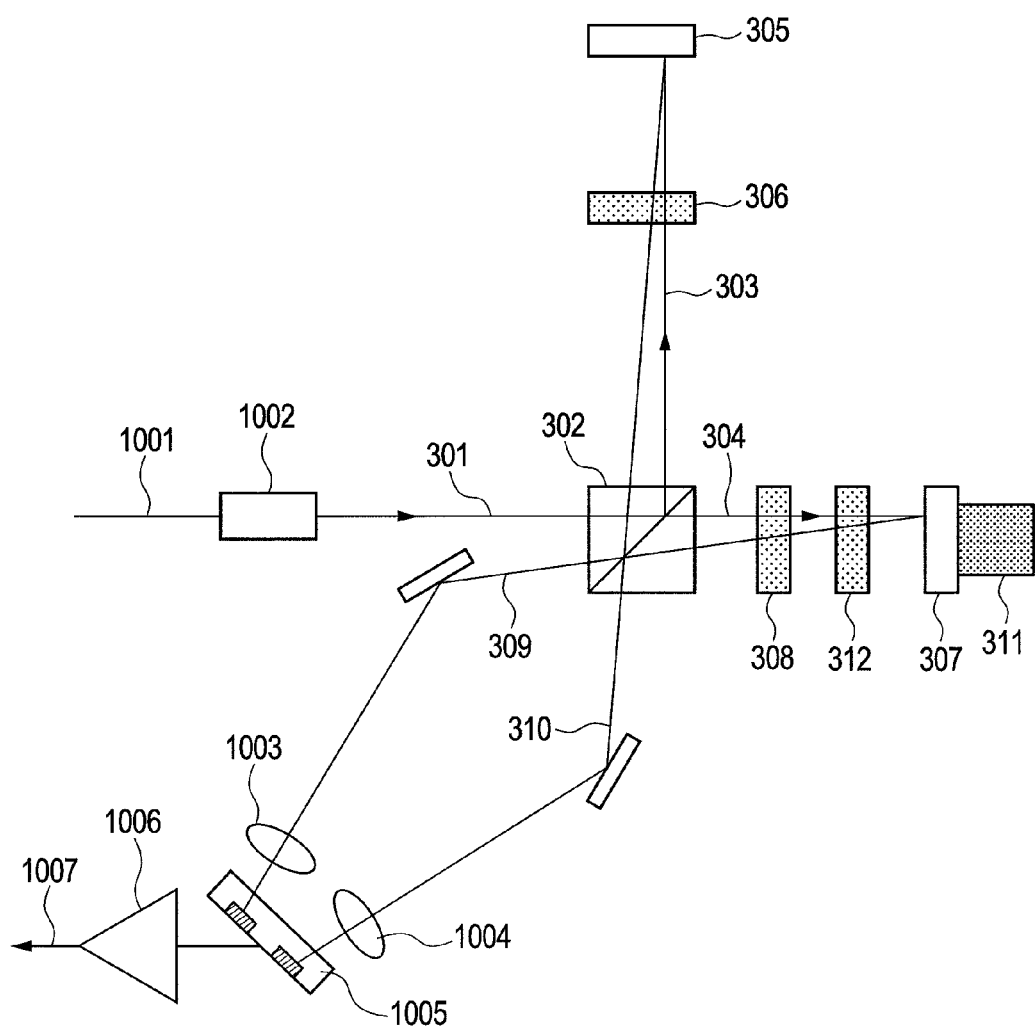
FIG. 10 is a view showing an example of the DPSK demodulator of the present invention.

FIG. 10 shows a configuration of a demodulator of a DPSK signal of the present invention. A DPSK-modulated signal transmitted from an optical fiber 1001 is made into a parallel light by a collimator 1002, enters the half beam splitter 302, and is split into the first split light 303 and the second split light 304 at intensity ratio of 1:1. The first split light 303 enters the mirror 305 at an angle of nearly 90 degrees and a reflecting light from the mirror 305 enters the half beam splitter 302 again. Here, the quarter-wave plate 306 is inserted in the outbound and inbound optical path of the first split light 303, and the fast axis faces a direction that is at 45 degrees relative to p-polarization to be define by a separation plane of the half beam splitter 302. As a result, out of the polarization components of the first split light 303, p-polarization is converted to s-polarization on entering the half beam splitter 302 again and likewise p-polarization is converted to s-polarization. In the same way, the second split light 304 enters the mirror 307 at an angle of nearly 90 degrees and a reflecting light from the mirror 307 enters the half beam splitter 302, and since the quarter-wave plate 308 is inserted in outbound and inbound optical paths (the phase advance direction is at 45 degrees relative to p-polarization), p-polarization and s-polarization are reversed. Also, the silicon monocrystal 312 is inserted in outbound and inbound optical paths of the split light 304 and therefore optical phase modulation for the two split lights 303 and 304 is performed by controlling a drive voltage for the Piezo actuator. The first split light 303 and the second split light 304 are combined when entering the half beam splitter 302 again and the first interference light 309 and the second interference light 310 are generated. Here, the mirrors 305 and 307 are disposed so that the optical length difference between the first split light 303 and the second split light 30r is equivalent to one bit of modulated signal. For example, when modulated frequency if 40 Gbps, optical length difference becomes approximately 7.5 mm. Consequently, the first interference light 309 and the second interference light 310 fall into constructive interference state or destructive interference state according to whether an amount of phase shift between adjacent bits of a measured light is 0 or π, resulting in a phase modulated signal being converted to an optical intensity signal. These interference lights are collected into two receivers of a balanced photodetector 805 respectively by the collecting lenses 803, 804. The balanced photodetector 805 outputs a current signal equivalent to the intensity difference between these interference lights, and the output is converted to a voltage signal by a transimpedance 805 to obtain a final output 807.

Figure 11:
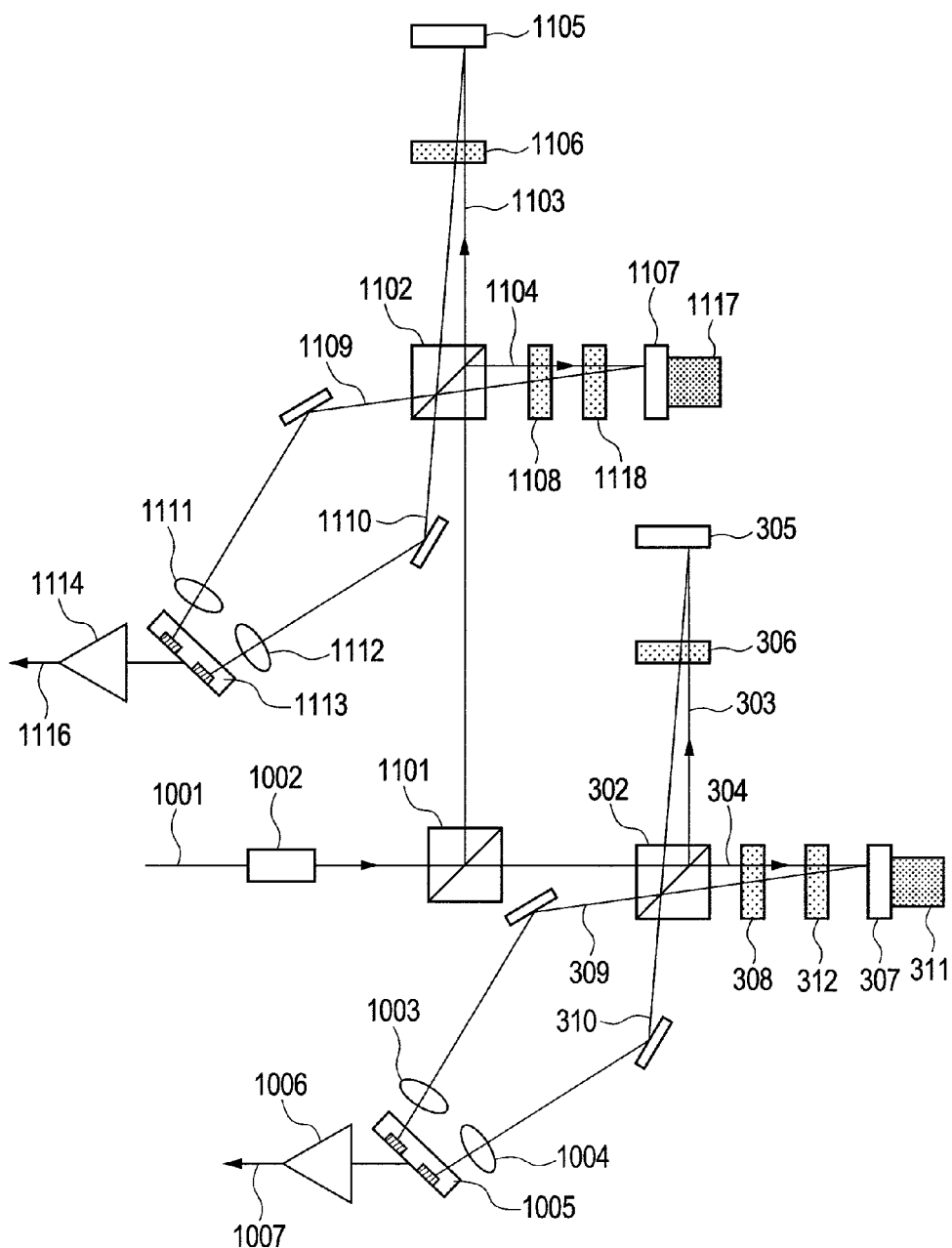
FIG. 11 is a view showing the DQPSK demodulator of the present invention.

This embodiment is a demodulator of DPSK signals but can be readily extended to a demodulator of DQPSK or general DMPSK. A configuration of this demodulator is shown in FIG. 11. In this configuration, a phase modulate measure light transmitted from the optical fiber 801 is split into two beams by the half beam splitter after it is made a parallel light by the collimator 802, and respective split lights are processed in the same way as a DPSK demodulator to output two output signals 807, 915. However, optical phase modulation by the silicon monocrystals 312, 1118 and Piezo actuators 311, 1117 are controlled so that the phase difference between two delay line interferometers become 90 degrees.

Sixth Embodiment

Figure 12:
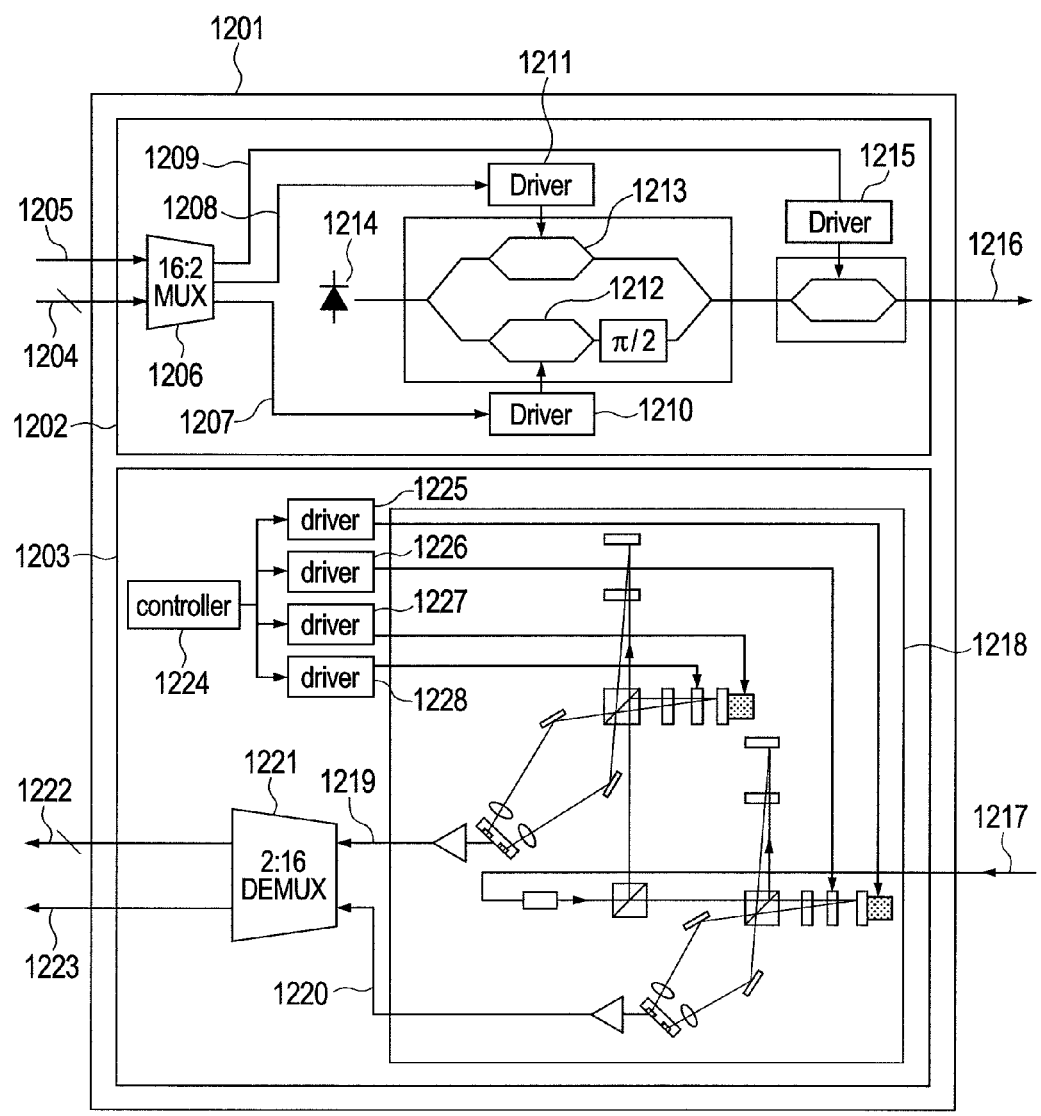
FIG. 12 is a view showing a configuration of a DPSK transceiver of the present invention.

FIG. 12 shows a configuration of a DPSK signal transceiver (an optical communication module) of the present invention. This embodiment is for DQPSK. As shown in FIG. 12, the transceiver 1201 consists of a transmitter 1202 and a receiver 1203. In the transmitter 1202, a first data modulation signal 1207, a second data modulation signal 1208, and a clock signal 1209 are generated from a plurality of data signals 1204, a clock signal 1205, and a multiplexer 1206. The first data modulation signal 1207 and the second data modulation signal 1208 modulate a first phase modulator 1212 and a second phase modulator 13 respectively a first driver 1210 and a second driver 1211, and perform a DPSK modulation to a light emitted from a laser light source 1214. The clock signal 1209 is sent to a third drive 1215 and pulse-like modulation is made to a DPSK-modulated light. A modulated light 1216 is transmitted in this way.

A DPSK-modulated light 1217 is input to the receiver, two output signals 1219, 1220 equivalent to a in-phase component and a quadrature component are generated by a demodulator 1218 similar to one shown in Fourth Embodiment, and these output signals are split into a plurality of data signals 1222 and clock signals 1223 in a demultiplexer 1221 (a signal processor). A controller 1224 controls drivers 1226, 1228 that generate a drive signal to heat the silicon monocrystal according to whether the system is activated, is in normal operation, or is switched from activation to normal operation, and drivers 1225, 1227 that generate a drive voltage signal to the Piezo actuator, as shown in First Embodiment. Although the module for DQPSK is described here, it goes without saying that any of the abovementioned embodiments can be applied.

According to the present invention, it is possible to configure a receiver of a large capacity optical communication system easily, compactly, and inexpensively, and thereby contribute to realization of larger communication capacity.

What is claimed is:

1. An interferometer, comprising:
   a light splitter configured to split a measured light into a first split light and a second split light;
   a unit configured to multiplex the first split light and the second split light, to generate a first interference light and a second interference light;
   a first optical phase modulation unit configured to adjust a phase difference between the first split light and the second split light;
   a second optical phase modulation unit configured to adjust a phase difference between the first split light and the second split light;
   a controller configured to drive one or both of the first optical phase modulation unit and the second optical phase modulation unit, according to whether an optical system, including the interferometer, is in a system activation mode or in a normal operation mode;
   wherein when the optical system is in a system activation mode, the controller drives the first optical phase modulation unit;
   wherein when the optical system is in a normal operation mode, the controller drives the second optical phase modulation unit but does not drive the first optical phase modulation unit; and
   wherein the first optical phase modulation unit is configured to operate faster in modulation speed than the second optical phase modulation unit.

2. The interferometer according to claim 1, wherein the first optical phase modulation unit includes a Piezo actuator on which a mirror is mounted that is configured to reflect the first split light or the second split light.

3. The interferometer according to claim 1, wherein the second optical phase modulation unit includes a heating element inserted in an optical path of the first split light or the second split light.

4. The interferometer according to claim 1, wherein the second optical phase modulation unit includes a liquid crystal component inserted in an optical path of the first split light or the second split light.

5. The interferometer according to claim 1, wherein the second optical phase modulation unit includes an expanding component on which a mirror configured to reflect the first split light or the second split light is mounted.

6. The interferometer according to claim 1, wherein the first optical phase modulation unit includes an MEMS MIRROR configured to reflect the first split light or the second split light.

7. A differential phase-shift keying (DPSK) demodulator, comprising:
   an interferometer configured to generate a first interference light and a second interference light, wherein the interferometer includes:
   a light splitter configured to split a measured signal into a first split light and a second split light;
   an optical multiplexer configured to multiplex the first split light and the second split light;
   a first optical phase modulation unit configured to adjust a phase difference between the first split light and the second split light;
   a second optical phase modulation unit configured to adjust a phase difference between the first split light and the second split light;
   a controller configured to drive one or both of the first optical phase modulation unit and the second optical phase modulation unit, according to whether an optical system, including the interferometer, is in a system activation mode or in a normal operation mode;
   wherein when the optical system is in a system activation mode, the controller drives the first optical phase modulation unit;
   wherein when the optical system is in a normal operation mode, the controller drives the second optical phase modulation unit but does not drive the first optical phase modulation unit; and
   wherein the first optical phase modulation unit is configured to operate faster in modulation speed than the second optical phase modulation unit; and
   a detector configured to detect the first interference light and the second interference light, and configured to output an electric signal equivalent to an intensity difference between the first interference light and the second interference light.

8. The demodulator according to claim 7,
wherein the light splitter has a first light splitting unit and a second light splitting unit and a third light splitting unit configured to bifurcate a measured signal into a light which is split by the first light splitting unit and a light which is split by the second light splitting unit;
wherein the interferometer has a first interferometer including the first light splitting unit and a second interferometer including the second light splitting unit; and
wherein the detector has a first detector and a second detector, the first detector detecting lights generated by the first interferometer and the second detector detecting lights generated by the second interferometer.

9. The demodulator according to claim 7, wherein the first optical phase modulation unit includes a Piezo actuator on which is mounted a mirror configured to reflect the first split light or the second split light.

10. The demodulator according to claim 7, wherein the second optical phase modulation unit includes a heating element inserted in an optical path of the first split light or the second split light.

11. The demodulator according to claim 7, wherein the second optical phase modulation unit includes a wedge prism inserted in an optical path of the first split light or the second split light.

12. The demodulator according to claim 7, wherein the second optical phase modulation unit includes a liquid crystal component inserted in an optical path of the first split light or the second split light.

13. The demodulator according to claim 7, wherein the second optical phase modulation unit is an expanding component on which is mounted a mirror configured to reflect the first split light or the second split light.

14. The demodulator according to claim 7, wherein the first optical phase modulation unit includes an MEMS MIRROR configured to reflect the first split light or the second split light.

15. An optical communication module having a receiver in which a DPSK-modulated measured light is inputted and which generates a plurality of data signals and a clock signal, the receiver comprising:
an interferometer configured to generate a first interference light and a second interference light, the interferometer comprising:
a light splitter configured to split a measured signal into a first split light and a second split light;
an optical multiplexer configured to multiplex the first split light and the second split light, to generate the first interference light and the second interference light;
a first optical phase modulation unit configured to adjust a phase difference between the first split light and the second split light;
a second optical phase modulation unit configured to adjust a phase difference between the first split light and the second split light; and a controller configured to drive one or both of the first optical phase modulation unit and the second optical phase modulation unit, according to whether an optical system, including the interferometer, is in a system activation mode or in a normal operation mode;
wherein when the optical system is in a system activation mode, the controller drives the first optical phase modulation unit;
wherein when the optical system is in a normal operation mode, the controller drives the second optical phase modulation unit but does not drive the first optical phase modulation unit; and
wherein the first optical phase modulation unit is configured to operate faster in modulation speed than the second optical phase modulation unit;
a detector configured to detect the first interference light and the second interference light, and configured to output an electric signal equivalent to an intensity difference between the first interference light and the second interference light;
a signal processor configured to generate a plurality of data signals from an electric signal outputted from the detector;
a first driver configured to generate a first adjustment signal to the first optical phase modulation unit; and
a second driver configured to generate a second adjustment signal to the second optical phase modulation unit.

16. The interferometer according to claim 1,
wherein when the optical system is in a time of change of phase control element, between the system activation mode and the normal operation mode, the controller maintains the phase of a modulated signal to remain about constant, by driving the second optical phase modulation unit, while decreasing the drive of the first optical phase modulation unit until the controller does not drive the first optical phase modulation unit.

17. The demodulator according to claim 7,
wherein when the optical system is in a time of change of phase control element, between the system activation mode and the normal operation mode, the controller maintains the phase of a modulated signal to remain about constant, by driving the second optical phase modulation unit, while decreasing the drive of the first optical phase modulation unit until the controller does not drive the first optical phase modulation unit.

18. The optical communication module according to claim 15,
wherein when the optical system is in a time of change of phase control element, between the system activation mode and the normal operation mode, the controller maintains the phase of a modulated signal to remain about constant, by driving the second optical phase modulation unit, while decreasing the drive of the first optical phase modulation unit until the controller does not drive the first optical phase modulation unit.

* * * * *